United States Patent [19]

Amborn et al.

[11] Patent Number: 5,295,922

[45] Date of Patent: Mar. 22, 1994

[54] DIFFERENTIAL DRIVE

[75] Inventors: Peter Amborn, Neunkirchen; Wolfgang Hildebrandt, Siegburg, both of Fed. Rep. of Germany

[73] Assignee: Viscodrive GmbH, Lohmar, Fed. Rep. of Germany

[21] Appl. No.: 925,532

[22] Filed: Aug. 5, 1992

[30] Foreign Application Priority Data

Aug. 14, 1991 [DE] Fed. Rep. of Germany ....... 4126866

[51] Int. Cl.$^5$ .......................... F16H 1/45; F16H 1/42; B60K 17/348
[52] U.S. Cl. .................................... 475/248; 475/252; 475/346
[58] Field of Search ............... 475/220, 248, 252, 338, 475/339, 346

[56] References Cited

U.S. PATENT DOCUMENTS

| | | |
|---|---|---|
| 1,225,842 | 5/1917 | Mennie .................. 475/248 X |
| 1,229,548 | 6/1917 | Van Sant .................. 475/90 |
| 1,397,066 | 11/1921 | Williams .................. 475/248 |
| 5,122,101 | 6/1992 | Tseng .................. 475/252 |
| 5,122,102 | 6/1992 | Chludek et al. .................. 475/252 |
| 5,147,252 | 9/1992 | Mace et al. .................. 475/252 X |
| 5,176,591 | 1/1993 | Krisher .................. 475/248 X |

FOREIGN PATENT DOCUMENTS

| | | | |
|---|---|---|---|
| 347165 | 6/1988 | European Pat. Off. | |
| 356401 | 2/1990 | European Pat. Off. | ............ 475/252 |
| 811650 | 8/1951 | Fed. Rep. of Germany | ...... 475/252 |
| 368794 | 12/1906 | France | ................. 475/248 |
| 2615262 | 5/1987 | France | |
| 10617 | of 1915 | United Kingdom | ................ 475/252 |

Primary Examiner—Leslie A. Braun
Assistant Examiner—Khoi Ta
Attorney, Agent, or Firm—Harness, Dickey & Pierce

[57] ABSTRACT

A differential drive has a drivable differential carrier rotatably supported in a differential housing. Two axle shaft gears are rotatably held in cylindrical bores in the differential carrier. The axle shaft gears are coaxially arranged relative to each other. A plurality of differential gears are supported in bores in the differential carrier. The axle shaft gears rotate with the differential gears and are arranged axis-parallel. One group of the differential gears engage one of the axle shaft gears and another group of differential gears engage the other of the axle shaft gears. Each of the one group of the differential gears engage at least one of the other group of differential gears to achieve an uneven torque distribution between the axle shaft gears. Also, both the axle shaft gears have substantially equal rolling circle diameters and equal outer diameters and at least the gears of the one group of differential gears have two axially different regions with different rolling circle diameters. One of two regions engages one of the axle shaft gears and the other one engages at least one of the other group of differential gears.

7 Claims, 4 Drawing Sheets

DIFFERENTIAL DRIVE

BACKGROUND OF THE INVENTION

The invention relates to a differential drive with a drivable differential carrier rotatably supported in a differential housing. Two axle shaft gears are rotatably held in cylindrical bores in the differential carrier. The two axle shaft gears are coaxially arranged relative to one another. A plurality of differential gears are also supported in bores in the differential carrier. The differential gears rotate with the differential carrier and are arranged axis-parallel therewith and to the axle shaft gears. A first group of differential gears engages one of the axle shaft gears and a second group of differential gears engages the other of the axle shaft gear. Each differential gear of the first group engages at least one of the differential gears of the second group to achieve an uneven torque distribution between the axle shaft gears.

Differential drives of this type are used as so-called central differentials in motor vehicles driven by several axles. Central differentials distribute torque unevenly to the driven axles with the highest percentage of torque, as a rule, being allocated to the axle loaded by the engine. A differential drive of this type is shown in EP 0 347 165 A1. Here, a differential has axle shaft gears of different sizes spaced at axial distances from one another. This spacing ensures that the differential gears engage either one or the other axle shaft gear and are able to find a region of undisturbed mutual tooth engagement.

SUMMARY OF THE INVENTION

It is the object of the present invention to further develop a differential of this type to achieve production technical and/or operational advantages. Advantages include achieving greatly uneven torque values by a simple means, simplifying production of the differential carrier, and reducing or shortening the length of the differential carrier.

The objective is achieved by both axle shaft gears having substantially equal rolling circle diameters and equal outer diameters, while also the gears of at least one group of differential gears have two axially different tooth regions with different rolling circle diameters. One of the regions engages one of the axle shaft gears and the other region engages at least one gear of the other group of differential gears.

Another advantage is that the axle shaft gears which, as a rule, are larger and therefore more expensive, may be identical parts. In consequence, the bores for the axle shaft gears may be produced in the same way, especially as through-bores, and, if necessary, a spacing sleeve may be inserted into the differential carrier between the axle shaft gears. The uneven torque distribution is achieved by the different effective lever arms at the toothed regions of at least one group of differential gears which creates corresponding different torque conditions at the axle shaft gear engaged therewith on the one hand and other differential gears on the other hand.

According to a first embodiment., the gears of the other group of differential gears also have two axially different toothed regions with different rolling circle diameters. The gears of the first group of differential gears have their large diameter toothed region engaging the associated axle shaft gear. The gears of the other group of differential gears have their small diameter toothed region engaging their associated axle shaft gear. In this case, the torque ratio determined by the ratio of the rolling circle diameters of the first group of differential gears is multiplied by the ratio of the rolling circle diameters of the second group of differential gears, thereby making it possible to achieve a highly uneven torque distribution. However, it is possible as well to provide the toothed regions only with slightly differing numbers of teeth. This design enables the two groups of differential gear to be identical relative to each other to further increase the number of identical parts. Correspondingly, stepped bores for the two groups of differential gears may advantageously be provided in the differential carrier from the same side. If, at the same time, the bores for the axle shaft gears are produced as through-bores, a very advantageous method is obtained to produce the differential carrier.

According to a further possible embodiment, the gears of the other group of differential gears have uniform toothed regions and are substantially the same tooth length as the associated axle shaft gear while being axially arranged to correspond to the latter. In this way, the axial length is shortened considerably because the axle shaft gears may be arranged to be very close to each other, and in extreme cases, their inner end faces may directly contact each other.

A first alternative of putting into effect the teaching in accordance with the invention includes the two regions of different rolling circle diameters of the differential gears having the same gear modulus, but different numbers of teeth. The advantage of this design is that the two toothed regions may be produced in a chip-forming way by the same tool.

A second alternative of putting into effect the teaching in accordance with the invention includes the two regions of different rolling circle diameters of the differential gears having the same numbers of teeth, but different gear moduli. Also, the ratio of numbers of teeth of the axle shaft gears is approximately identical to the inverse ratio of the gear moduli of the axle shaft gears. Thus, a simpler shape for the blank is achieved which is easier to produce by a non-chip-forming process.

In particular, the solution in accordance with the invention may be applied to differentials where the differential gears run on their tooth tips directly in pockets or bores of the differential carrier. Also, a solution is not excluded which involves differential gears and axle shaft gears both supported on journals. The teeth may be straight teeth, but to increase the friction forces, helical gears are also possible, which, because of the axial thrust in the teeth, cause higher friction forces of the differential at the end faces of the axle shaft gears.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are illustrated in the drawing wherein.

DETAILED DESCRIPTION OF THE PREFERRED EMBODIMENTS

The figures each show a differential carrier which is supported in a differential housing (not illustrated). The flanges are to be attached to a crown wheel for driving purposes.

Figure 1A:
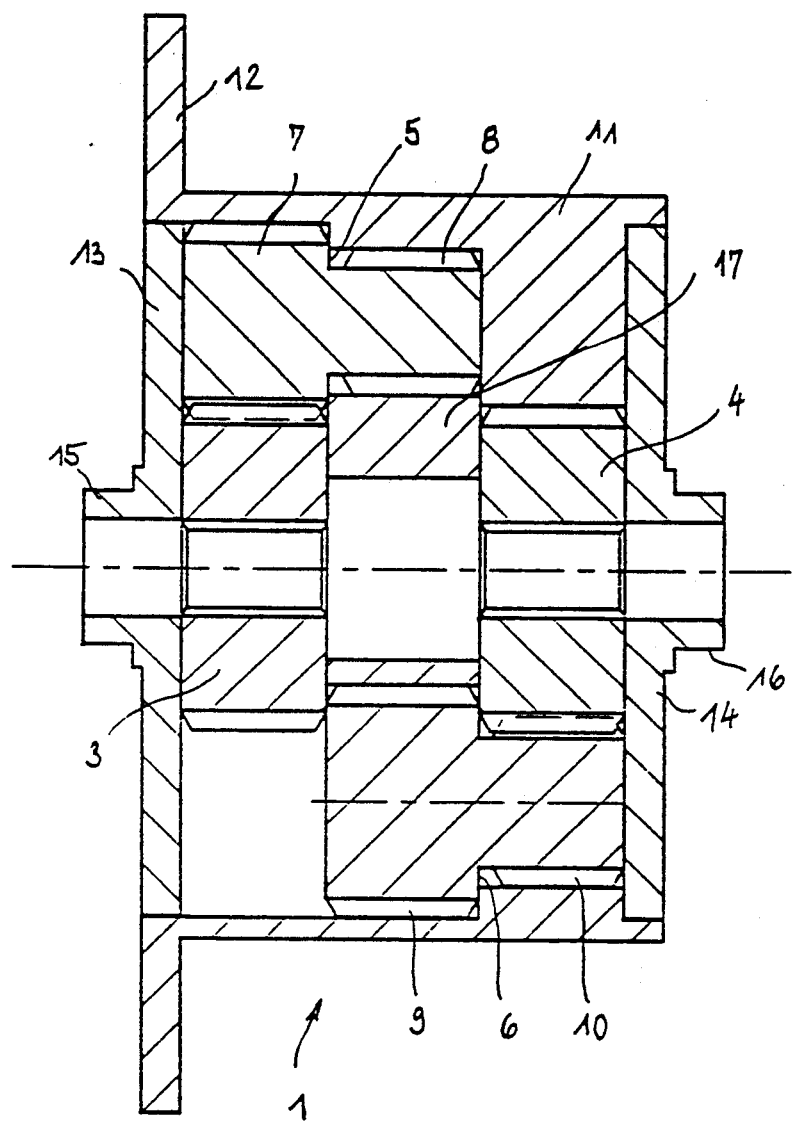
FIG. 1a is a cross section view of a first embodiment of a differential in accordance with the invention.
Figure 1B:
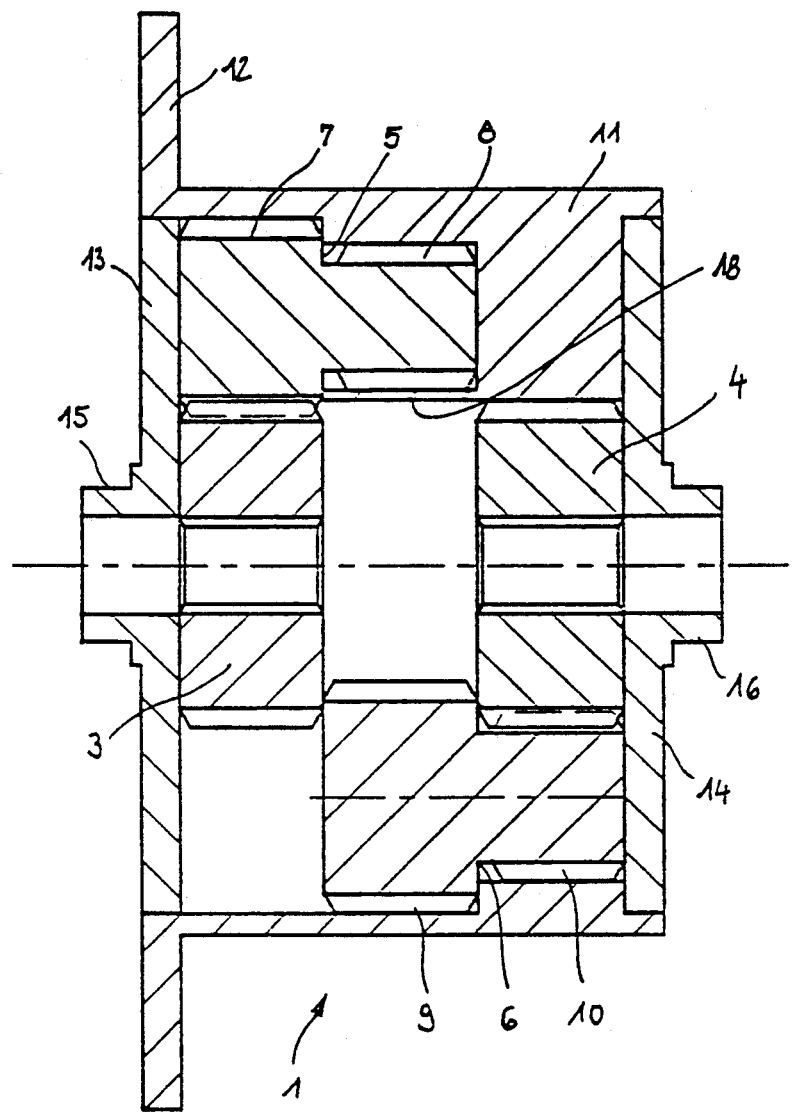
FIG. 1b is a cross section view like FIG. 1a of a second embodiment of a differential in accordance with the invention.

In FIGS. 1a and 1b, two identically sized axle shaft gears 3, 4 are held in cylindrical bores in the differential carrier 1. The differential carrier has a central portion 11 with an integral flange 12 to secure a driving crown wheel (not illustrated). Two covers 13, 14 are attached to the central portion 12 and axially secure the axle shaft gears 3, 4 and differential gears 5, 6 in the differential carrier The covers are provided with projections 15, 16 which support the differential carrier in the differential drive housing (not illustrated).

The axle shaft gears 3 and 4 directly engage differential gears 5 and 6, respectively The differential gear 5 has two axially separated toothed regions 7, 8. Toothed region 7 has a greater rolling circle diameter and, in this case, a larger number of teeth which engage the axle shaft gear 3. In the same way, the differential gear 6 comprises two toothed regions 9, 10 with different rolling circle diameters. In this case, with different numbers of teeth, the toothed region 10, with the smaller number of teeth, engages the other axle shaft gear 4. The axially coinciding toothed regions 8 (small) and 9 (large) of the differential gears 5 and 6, respectively, engage one another. The transmission ratio between the axle shaft gears 3, 4 corresponds to the product of the tooth ratio of the differential gear regions 7 to 8, multiplied by the tooth ratio of the differential gear regions 9 to 10. In deviating from the above-explained design, where the differential gears differ slightly, the differential gears may also be designed as identical parts.

In FIG. 1a, the axle shaft gears 3, 4 are supported axially inwardly on an intermediate portion 17 of the central portion 11 of the differential carrier. The portion 17 may also be a separate sleeve inserted into the central portion.

In FIG. 1b, the axle shaft gears 3, 4 are accommodated by a continuous through-bore 18 of the central portion 11 of the differential carrier. The axial shaft gears 3, 4 are axially inwardly supported on the end faces of the toothed region 9 of the differential gears 6. This embodiment has at least two differential gears 5 and two differential gears 6 in different circumferential positions in the differential carrier.

Figure 2:
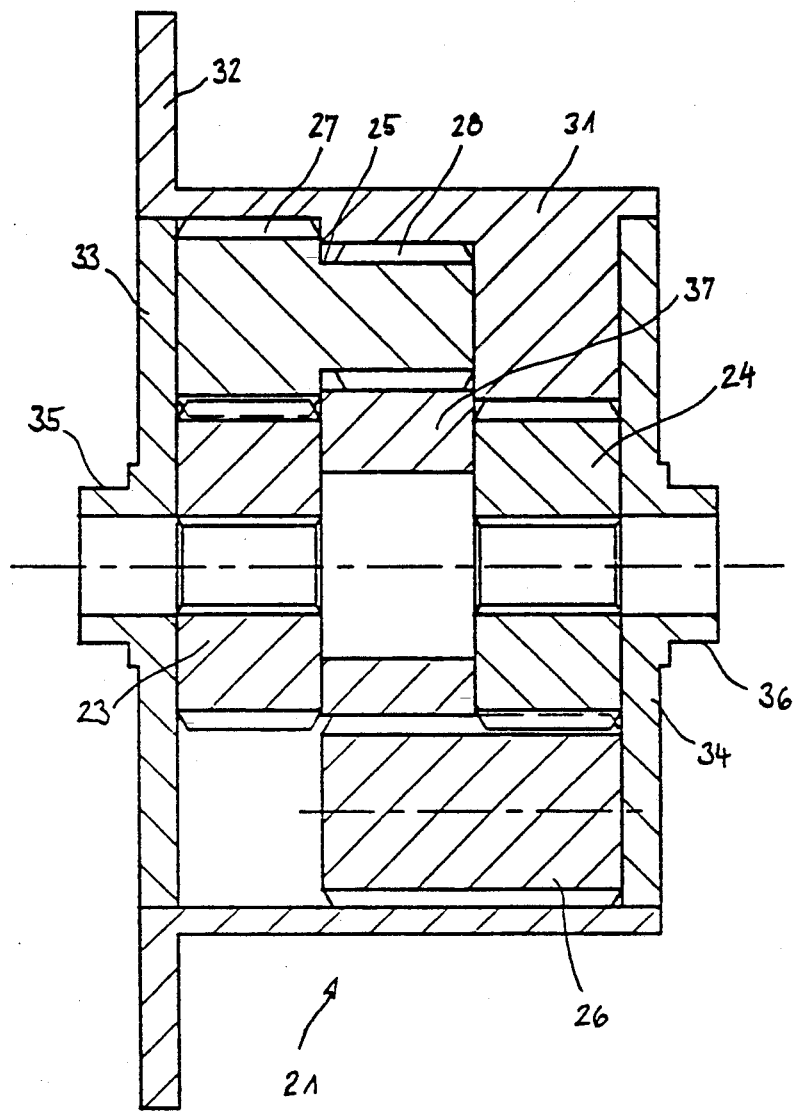
FIG. 2 is a cross section view of a differential in accordance with the invention.

FIG. 2 shows a differential carrier 21 with a central portion 37 and an integral flange 32 to secure a driving crown wheel (not illustrated). Two covers 33, 34, are attached to the flange 32 and axially secure the axle shaft gears 23, 24 and differential gears 25, 26 in the differential carrier. The covers include projections 35, 36 on which the differential carrier may be supported in the differential drive housing (not illustrated). Two axle shaft gears 33, 34 of identical size are arranged in the differential carrier. As can be seen in FIG. 1, the axle shaft gears 33, 34 may each be inserted into its own cylindrical bore or they may be inserted into a continuous cylindrical bore. Also, the intermediate region of the differential carrier 21 may constitute an inserted sleeve. The axle shaft gear 23 directly engages a first differential gear 25 and the axle shaft gear 24 directly engages a second differential gear 26. The differential gear 25 has two toothed regions 27, 28 of different rolling circle diameters. In this case, the toothed regions have different numbers of teeth of which the large toothed region 27 directly engages the axle shaft gear 23. The smaller toothed region 28 directly engages the differential gear 26. The gear 26 has a continuous uniform diameter. The transmission ratio between the axle shaft gears 23, 24 is determined entirely by the ratio of the numbers of teeth of the toothed regions 27 to 28 of the differential gear 25.

Figure 3:
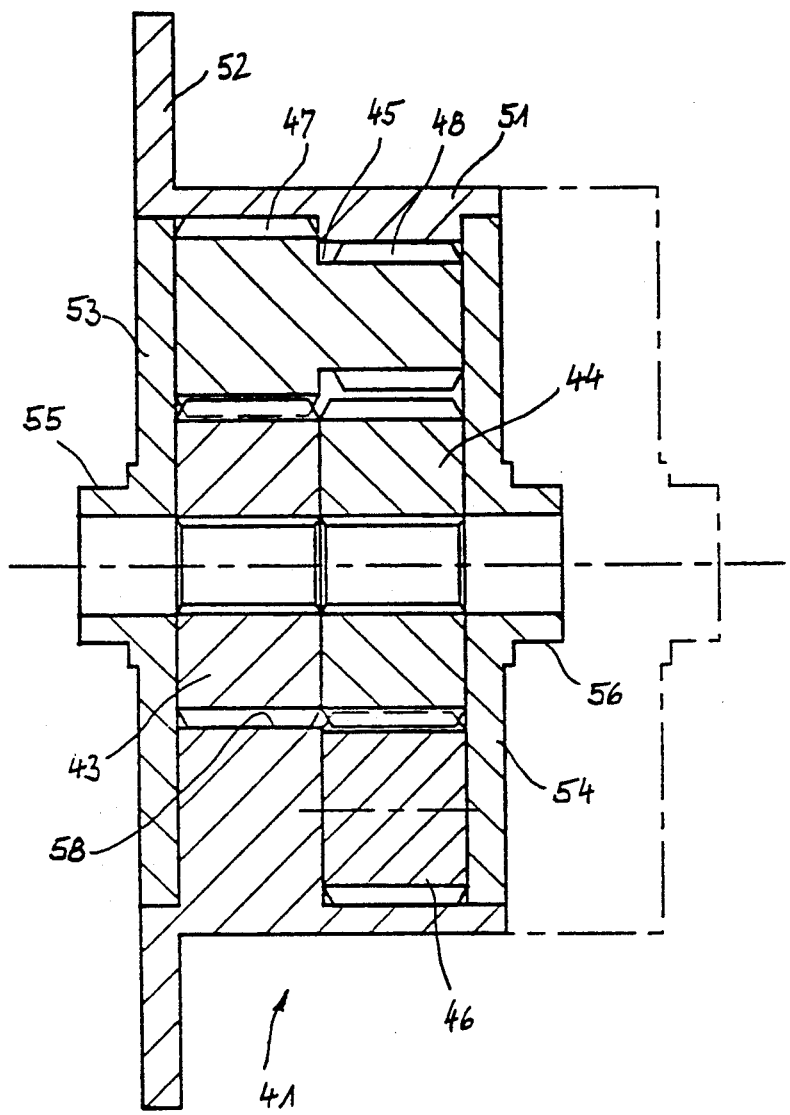
FIG. 3 is a cross section view of a differential in accordance with the invention.

FIG. 3 shows a differential carrier 41 with a central portion 51 and an integral flange 52 to secure a driving crown wheel (not illustrated). Two covers 53, 54 are attached to the central portion 52 and axially secure the axle shaft gears 43, 44 and differential gears 45, 46 in the differential carrier. The covers have projections 55, 56 which may support the differential carrier in the differential drive housing (not illustrated). The two axle shaft gears 43, 44, of identical size, are inserted in the carrier directly axially adjoining one another. In this way, the gears 43, 44 may be accommodated in an axial through-bore 58 in the differential carrier. A first differential gear 45 directly engages the axle shaft gear 43 and a second differential gear 46 directly engages the axle shaft gear 44. The differential gear 46 has the same length and axial position as the axle shaft gear 44. The gear 46 engages a toothed region 48 of the first differential gear 45. The toothed region 48 has a smaller rolling circle diameter, and especially in this case, a smaller number of teeth. In addition, the gear 45 has a toothed region 47 with a greater rolling circle diameter than region 48. Also, region 47 has a larger number of teeth, which directly engages the axle shaft gear 43. The contour of the differential carrier 21, as indicated in FIG. 2, shows that the axial length of the differential design as illustrated here has been shortened.

It is appreciated that each of the three Figures only show one differential gear of each type engaging one of the axle shaft gears, however, further identical differential gears may be circumferentially distributed in the differential carrier. Instead of different numbers of teeth, it is also possible to provide different gear moduli while including the same numbers of teeth in order to achieve the different rolling circle diameters.

While the above detailed description describes the preferred embodiment of the present invention, the invention is susceptible to modification, variation, and alteration without deviating from the scope and fair meaning of the subjoined claims.

We claim:

1. A differential drive comprising:
   a drivable differential carrier having a plurality of cylinder bores;
   two axle shaft gears are rotatably held in the cylindrical bores in the differential carrier and are arranged coaxially relative to each other, both said axle shaft gears having practically equal rolling circle diameters and equal outer diameters;
   a plurality of differential gears are supported in bores in the differential carrier, said axle shaft gears rotate with the differential carrier and are axis-parallel arranged therewith;
   a first group of the differential gears engaging one of the axle shaft gears and a second group of the differential gears engaging the other of the axle shaft gears, at least the gears of one of the groups of differential gears having two axially different toothed regions with different rolling circle diameters, one of said regions engaging one of the axle shaft gears and the other region engaging at least one of the other group of differential gears for achieving an uneven torque distribution between the axle shaft gears.

2. A differential drive according to claim 1, wherein the gears of the other group of differential gears includes two axially different tooth regions with different rolling circle diameters, the gears of the first group of differential gears having their larger toothed region engaging the associated axle shaft gear and the gears of the second group of differential gears having their smaller toothed region engaging the associated axle shaft gear.

3. A differential drive according to claim 1, wherein the gears of the other group of differential gears have uniform toothed regions and the gears of said other group of differential gears having substantially the same toothed length as the associated axle shaft gear and being axially arranged to respond to the axle shaft gear.

4. A differential drive according to claim 3, wherein the axle shaft gears support one another directly or indirectly in the differential carrier via their inwardly directed end faces.

5. A differential drive according to claim 2, wherein the axle shaft gears, via their inwardly directed end faces in the differential carrier, are supported directly on the larger and centrally positioned toothed region of the one group of differential gears.

6. A differential drive according to claim 1, wherein the two regions of different rolling circle diameters of the differential gears have the same gear moduli, but different numbers of teeth.

7. A differential drive according to claim 1, wherein the two regions of different rolling circle diameters of the differential gears have the same numbers of teeth, but different gear moduli, with the ratio of numbers of teeth of the axle shaft gears being approximately identical to the inverse ratio of the gear moduli of the axle shaft gears.

* * * * *